United States Patent
Shi et al.

(10) Patent No.: US 9,886,109 B2
(45) Date of Patent: Feb. 6, 2018

(54) WRITING DEVICE FOR ELECTRONIC PAPER AND ELECTRONIC PAPER TAG SYSTEM

(71) Applicant: BOE TECHNOLOGY GROUP CO., LTD., Beijing (CN)

(72) Inventors: Shiming Shi, Beijing (CN); Yanliu Sun, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 138 days.

(21) Appl. No.: 14/354,234

(22) PCT Filed: Dec. 5, 2013

(86) PCT No.: PCT/CN2013/088646
§ 371 (c)(1),
(2) Date: Apr. 25, 2014

(87) PCT Pub. No.: WO2014/180126
PCT Pub. Date: Nov. 13, 2014

(65) Prior Publication Data
US 2015/0212596 A1    Jul. 30, 2015

(30) Foreign Application Priority Data
May 10, 2013  (CN) .......................... 2013 1 0173025

(51) Int. Cl.
*G06F 3/038* (2013.01)
*G09G 3/34* (2006.01)
(Continued)

(52) U.S. Cl.
CPC .......... *G06F 3/0383* (2013.01); *B41J 3/4076* (2013.01); *G06F 3/03545* (2013.01);
(Continued)

(58) Field of Classification Search
CPC .. G06F 3/14; G06F 3/147; G06K 1/12; G06K 17/0022; G06K 19/07703;
(Continued)

(56) References Cited

U.S. PATENT DOCUMENTS 5,508,720 A  * 4/1996  DiSanto et al. ............... 345/169
9,326,394 B2 * 4/2016  Lin ........................ G06F 1/1647
(Continued)

FOREIGN PATENT DOCUMENTS

CN         1138385 A    12/1996
CN       201489682 U     5/2010
(Continued)

OTHER PUBLICATIONS

English foreign patent application CN102456322A (Translated Jul. 10, 2015).*
(Continued)

*Primary Examiner* — Bryan Earles
(74) *Attorney, Agent, or Firm* — Ladas & Parry LLP

(57) ABSTRACT

A writing device for electronic paper includes an array substrate, a master control module, an input module electrically connected with the master control module, and an array substrate driving module electrically connected with the master control module, the array substrate is electrically connected with the array substrate driving module, an upper surface of the array substrate is configured to be electrically connected with electronic paper to be written, the input module is configured to input operation instructions to the master control module, the master control module is configured to control the array substrate driving module to drive the array substrate for performing writing operations according to the operation instructions. An embodiment of the present invention further provides an electronic paper tag system including the electronic paper writing device. There-
(Continued)

fore, the writing device and the electronic paper tag system provided in embodiments of the present invention are particularly applicable to situations in which tag information is not required to be updated frequently (for example, doorplate, merchandise price labels).

18 Claims, 4 Drawing Sheets

(51) Int. Cl.
| | | |
|---|---|---|
| *G06F 3/0354* | (2013.01) | |
| *G06F 3/041* | (2006.01) | |
| *G09F 9/37* | (2006.01) | |
| *B41J 3/407* | (2006.01) | |
| *G06F 3/048* | (2013.01) | |

(52) U.S. Cl.
CPC ............ *G06F 3/0416* (2013.01); *G09F 9/372* (2013.01); *G09G 3/344* (2013.01); *G06F 3/048* (2013.01); *G09G 2380/14* (2013.01)

(58) Field of Classification Search
CPC ..... G06K 19/07758; G09F 3/208; G09F 9/30; G09F 3/204; G09G 3/344
See application file for complete search history.

(56) References Cited

U.S. PATENT DOCUMENTS

| | | | | |
|---|---|---|---|---|
| 2004/0070633 | A1* | 4/2004 | Nakamura | ............ G06F 3/1423 715/860 |
| 2004/0207568 | A1* | 10/2004 | Ooshima | ................ G06F 1/162 345/1.1 |
| 2007/0208785 | A1* | 9/2007 | Hayashi | ................. G11B 27/11 |
| 2007/0283248 | A1* | 12/2007 | Yoshida | ................. G09F 9/372 715/273 |
| 2009/0256814 | A1* | 10/2009 | Chung et al. | ................ 345/173 |
| 2011/0080362 | A1 | 4/2011 | Sprague | |
| 2011/0267306 | A1* | 11/2011 | Chang | ................... G06F 1/1616 345/174 |
| 2012/0098803 | A1* | 4/2012 | Chang | ................... G09G 3/344 345/204 |
| 2012/0113031 | A1 | 5/2012 | Lee et al. | |

FOREIGN PATENT DOCUMENTS

| | | |
|---|---|---|
| CN | 102456322 A | 5/2012 |
| CN | 102566814 A | 7/2012 |
| CN | 103295514 A | 9/2013 |
| JP | 2002-277849 A | 9/2002 |

OTHER PUBLICATIONS

International Search Report and Written Opinion dated Mar. 20, 2014; PCT/CN2013/088646.
First Chinese Office Action dated Mar. 4, 2015; Appln. No. 201310173025.7.
International Preliminary Report on Patentability Appln. No. PCT/CN2013/088646; dated Nov. 10, 2015.
Second Chinese Office Action Appln. No. 201310173025.7; dated Sep. 23, 2015.
Extended European Search Report dated Jan. 3, 2017; Appln. 13848103.1-1903/2996107; PCT/CN2013088646.

* cited by examiner

A-A

WRITING DEVICE FOR ELECTRONIC PAPER AND ELECTRONIC PAPER TAG SYSTEM

TECHNICAL FIELD

The present invention relates to electronic paper technologies, particularly to a writing device for electronic paper and an electronic paper tag system including the writing device.

BACKGROUND

Electronic ink involves a display material that can be obtained by encapsulating charged particles of different colors with a micro-capsule technology or a micro-cup technology. Gray scales of display are obtained by applying a voltage to electrodes at two ends of electronic ink for a certain time to drive charged particles so as to control the amount of particles moving towards two ends of the electrodes. Electronic ink can be used to prepare electronic paper and the electronic paper can be used to further produce flat displays. Flat displays including electronic paper can function as a novel kind of information communication media with the display effect similar to common paper. Due to their features of erasability, light weight, thin thickness and low power dissipation, they are well suitable to be portable electronic readers to replace traditional books, and are also well suitable to be electronic tags, doorplates or information cards posted on merchandises, in front of guest room doors or wards in stores, hotels or hospitals.

Current flat displays including electronic paper typically include electronic paper tags, driving circuits, control modules and communication modules that are integrated together. In this kind of structure, each electronic paper tag is an independent display capable of receiving data through communication module and displaying data on the electronic paper tag. However such an electronic paper tag is not applicable for situations in which tag information is not required to be updated frequently such as doorplates, merchandise price labels due to overly high costs, because of the contained circuit modules.

SUMMARY

An object of the present invention is to provide a writing device for electronic paper and an electronic paper tag system including the writing device. The electronic paper tag system utilizing the electronic paper writing device is applicable to situations in which tag information is not required to be updated frequently.

As one aspect of the present invention, a writing device for electronic paper is provided, wherein the writing device includes an array substrate, a master control module, an input module electrically connected with the master control module, and an array substrate driving module electrically connected with the master control module; the array substrate is electrically connected with the array substrate driving module, an upper surface of the array substrate is configured to be electrically connected with electronic paper to be written, the input module is configured to input operation instructions to the master control module, and the master control module drives the array substrate driving module to drive the array substrate for performing writing operation according to the operation instructions.

For example, the input module includes a touch screen and a touch screen control module electrically connected with the touch screen, the touch screen control module is electrically connected with the master control module, and the touch screen is configured to transfer information to be written into the electronic paper to the touch screen control module, the touch screen control module is able to convert the information input through the touch screen into the operation instructions, and the touch screen control module is able to transfer the operation instructions to the master control module.

For example, the writing device further includes a wireless communication module capable of receiving and transmitting wireless signals.

For example, the writing device further includes an audio output module electrically connected with the master control module and configured to output cue tones after completing the writing operation.

For example, the writing device further includes a storage module electrically connected with the master control module to store operation instructions and provide storage space for the master control module to control writing operation.

For example, the writing device further includes a position sensing module electrically connected with the master control module and configured to sense the electronic paper disposed on the array substrate.

For example, the position sensing module includes at least one size line made of a conductive material and a position detection controller electrically connected with the master control module, the size line is disposed on an upper surface of the array substrate and divides the upper surface of the array substrate into regions of respective sizes, a first end of each size line is electrically connected with a first end of the position detection controller, and a second end of each size line is electrically connected with a second end of the position detection controller.

For example, the array substrate includes a plurality of data lines and a plurality of scanning lines, the data lines and the scanning lines divide the array substrate into a plurality of pixel units, and each of the pixel units is provided with a pixel electrode; the array substrate driving module includes a gate driver to which the scanning lines are electrically connected and a source driver to which the data lines are electrically connected.

For example, the writing device further includes an enclosure in which the master control module, the input module, the array substrate and the array substrate driving module are provided, and the upper surface of the array substrate is exposed outside of the enclosure.

For example, the enclosure includes a body, in which the master control module, the input module, the array substrate and the array substrate driving module are embedded, and a cover pivotably mounted on the body and capable of covering at least a part of the upper surface of the array substrate.

For example, the enclosure further includes a fastener mounted on the body and capable of fastening the cover.

For example, the writing device further includes a first switch key electrically connected with the master control module to control turning-on or turning-off of the master control module, and the first switch key extends through the enclosure and protrudes from the enclosure.

For example, the writing device includes a second switch key electrically connected with the touch screen control module to control turning-on or turning-off of the touch screen control module, and the second switch key extends through the enclosure and protrudes from the enclosure.

As another aspect of the present invention, an electronic paper tag system is further provided, which includes a writing device and a piece of electronic paper; the writing device is the above-mentioned writing device provided in the present invention, the electronic paper is provided independent of the writing device, and a bottom surface of the electronic paper contacts an upper surface of the array substrate.

For example, the electronic paper includes an upper substrate, a common electrode disposed on a bottom surface of the upper substrate, and an insulating lower substrate disposed under the common electrode, with electronic ink filled between the upper substrate and the lower substrate.

The writing device provided in the embodiments of the present invention is independent of the electronic paper to be written, and can write the electronic paper as required. After a writing operation, the electronic paper and the writing device are separated, and then the electronic paper is set in an application occasion. Therefore, the writing device and the electronic paper tag system provided in the embodiments of the present invention are particularly applicable to situations in which tag information is not required to be updated frequently (for example, doorplate, merchandise price labels).

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

Figure 1:
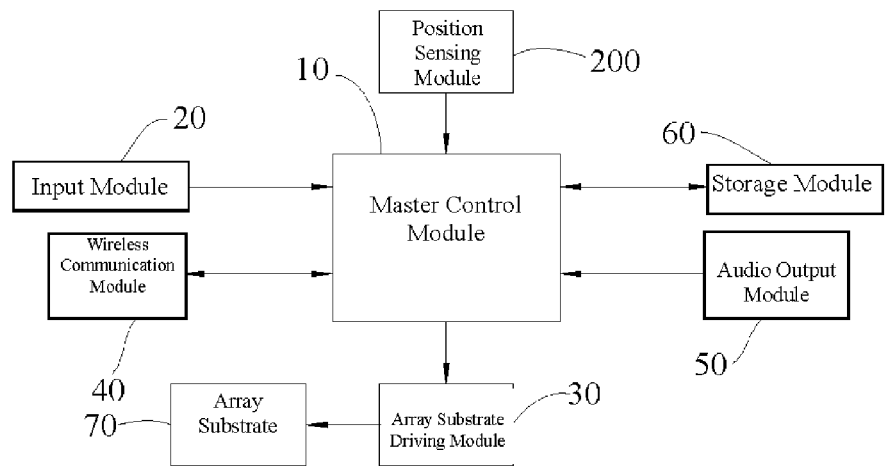
FIG. 1 is a principle schematic diagram of a writing device provided in an embodiment of the present invention.

| Reference numerals | |
|---|---|
| 10: master control module | 20: input module |
| 21: touch screen | 22: touch screen control module |
| 30: array substrate driving module | 31: gate driver |
| 32: source driver | 40: wireless communication module |
| 50: audio output module | 60: storage module |
| 70: array substrate | 71: pixel unit |

| -continued | |
|---|---|
| Reference numerals | |
| 72: scanning line | 73: pixel electrode |
| 74: data line | 75: thin film transistor |
| 76: resin layer | 77: gate insulating layer |
| 80: enclosure | 81: body |
| 82: cover | 83: fastener |
| 91: first switch key | 92: second switch key |
| 93: volume adjusting key | 100: electronic paper |
| 110: upper substrate | 120: common electrode |
| 130: electronic ink | 140: lower substrate |
| 21a: preview interface | 21b: input interface |
| 75a: drain electrode | 75b: active layer |
| 75c: source electrode | 75d: gate electrode |
| 200: position sensing module | 210: size line |
| 220: position detection controller | 210a: first size line |
| 210b: second size line | 210c: third size line |

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present invention belongs. The terms such as "a," "an," etc., are not intended to limit the amount, but indicate the existence of at least one. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Specific implementations of the present invention will be described in detail below with reference to the accompanying drawings. It is understood that the specific implementations described herein are only for the purpose of describing and explaining the present invention rather than limiting the present invention.

Figure 6:
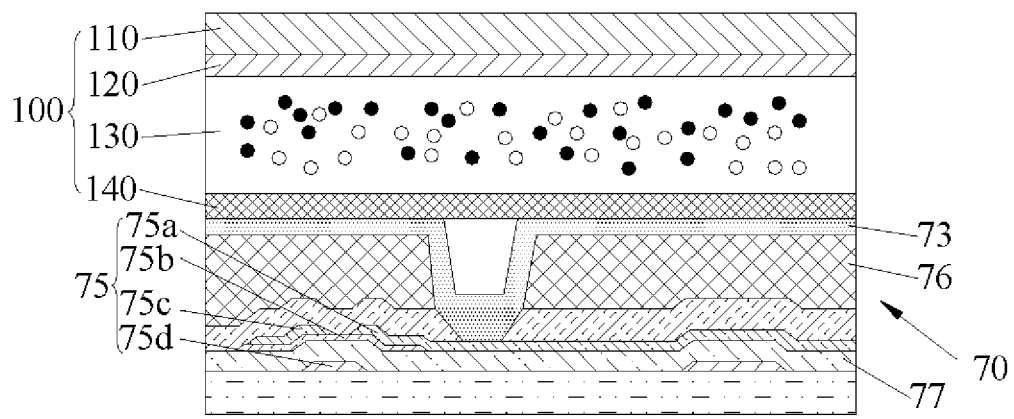
FIG. 6 is a sectional view of the electronic paper tag system illustrated in FIG. 5 at A-A.

In the present disclosure, directive terms "above/on" and "under" refer to the "above/on" and "under" directions in FIG. 6.

Figure 2:
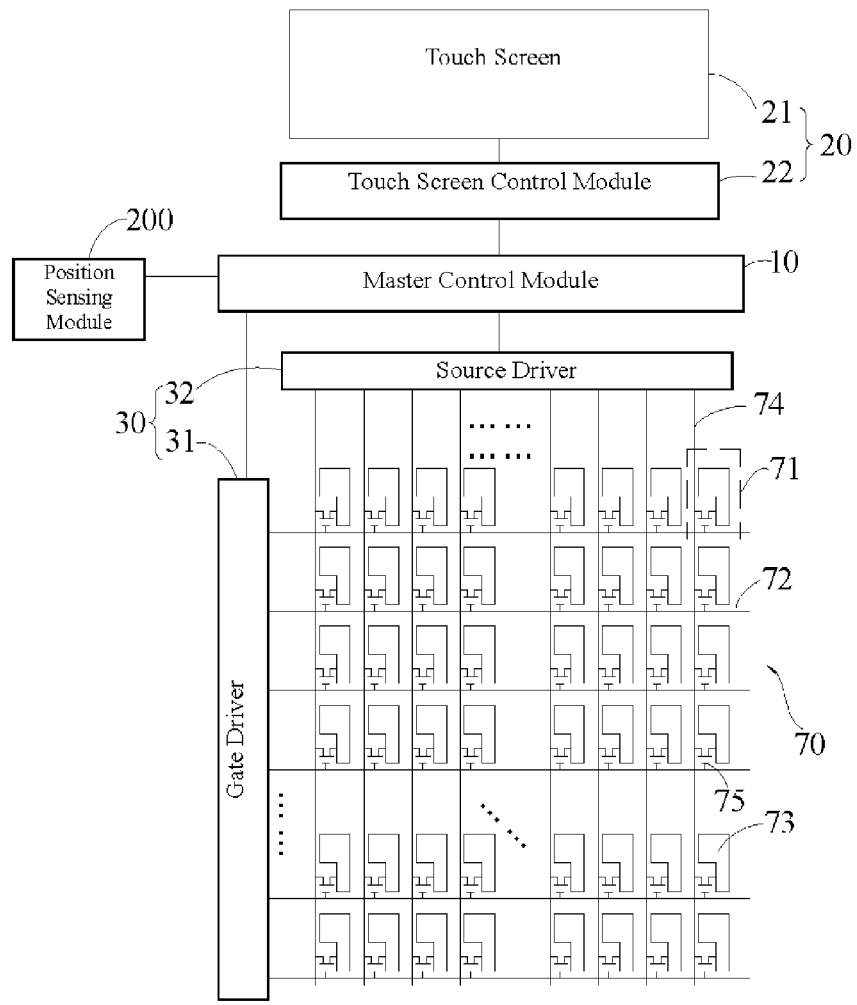
FIG. 2 is a schematic circuit diagram of a part of the writing device provided in an embodiment of the present invention.

As illustrated in FIGS. 1 and 2, as one aspect of the present invention, a writing device for electronic paper is provided. The writing device includes an array substrate 70, a master control module 10, an input module 20 electrically connected with the master control module 10, and an array substrate driving module 30 electrically connected with the master control module 10; the array substrate 70 is electrically connected with the array substrate driving module 30, and an upper surface of the array substrate 70 is configured to be electrically connected with electronic paper to be written; the input module 20 is configured to input operation instructions to the master control module 10, and the master control module 10 drives the array substrate driving module 30 to drive the array substrate 70 for performing writing operation according to the operation instructions.

Figure 4:
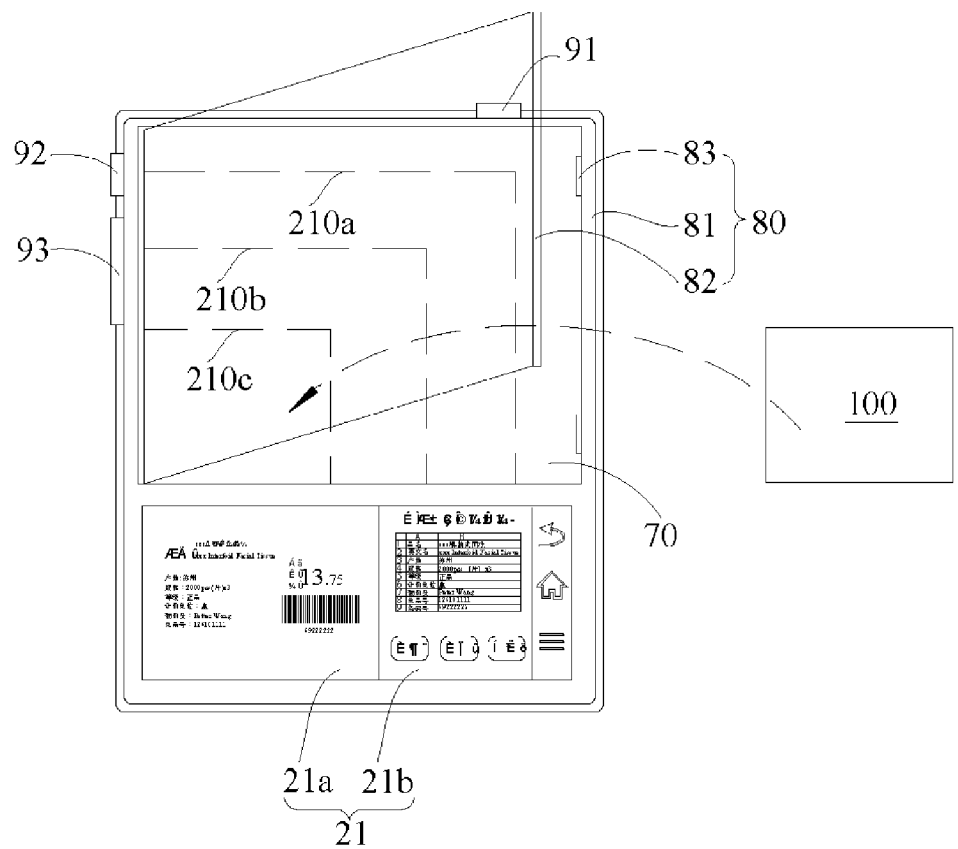
FIG. 4 is a schematic diagram before a writing operation of electronic paper by the electronic paper tag system provided in an embodiment of the present invention.
Figure 5:
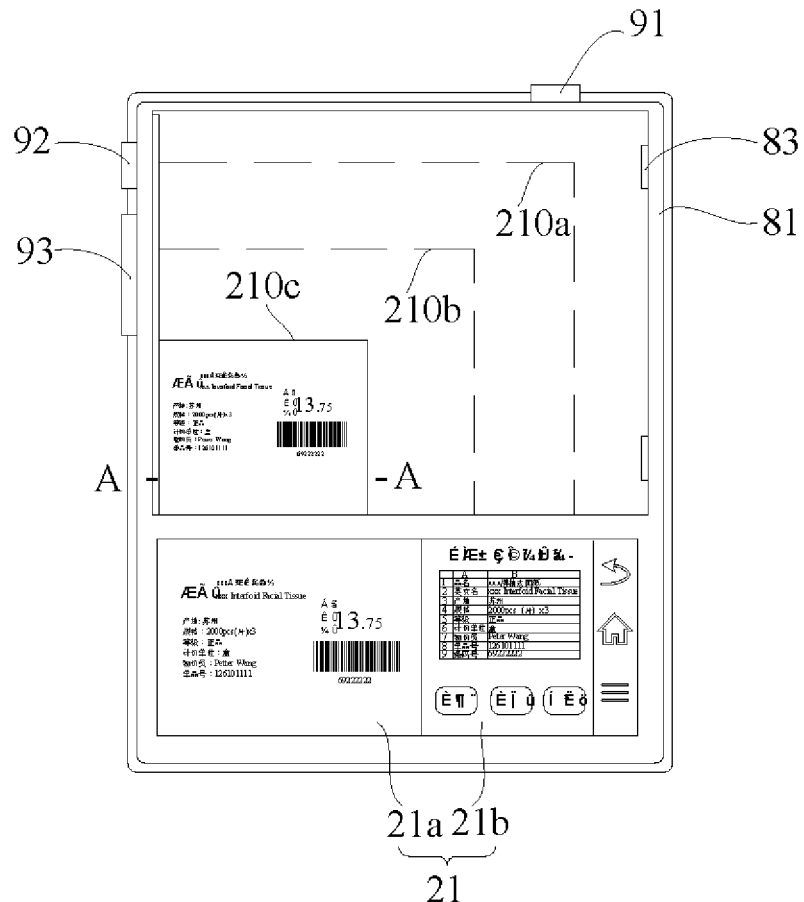
FIG. 5 is a schematic diagram during a writing operation of electronic paper by the electronic paper tag system provided in an embodiment of the present invention.

The writing device provided in an embodiment of the present invention is configured for an electronic paper tag system, and the electronic paper tag system further includes electronic paper independent of the writing device. As illustrated in FIGS. 4 and 5, the writing device for electronic paper provided in an embodiment of the present invention and the electronic paper 100 are independent to each other. When a piece of electronic paper 100 is to be written, the electronic paper 100 is placed on the upper surface of the array substrate 70, and the array substrate 70 and the electronic paper 100 together constitute a display panel (as illustrated in FIG. 6). When the writing device is supplied with power, the input module 20 is utilized to input operation instructions to the master control module 10, and the master control module 10 controls the array substrate driving module 30 to provide the array substrate 70 with scanning signals and data signals according to the operation instructions. The array substrate 70 and the electronic paper 100 together constitute a display panel to drive electronic ink in the electronic paper 100, thereby displaying contents input via the input module 20 on the electronic paper 100 and forming an electronic tag. Detail description will be presented below about how to use the input module 20 to input operation instructions to the master control module 10.

In the embodiments of the present invention, the electronic paper 100 and the writing device are independent to each other. After the electronic paper 100 has been written, the electronic paper 100 that has been written information is separated from the writing device, that is, the electronic paper 100 that has been written with information can be used in situations in which tag information is not required to be updated frequently. If the information on the electronic paper 100 is to be replaced, it is only required to remove the electronic paper 100 and put it into the writing device for re-writing.

As the electronic paper 100 and the writing device are made independent to each other, one writing device can be used to write a plurality of pieces of electronic paper 100, hence the overall costs of the electronic paper tag system can be reduced.

It is to be understood that after powering off, the electronic paper 100 selected in the embodiment of the present invention can still work to display the information written into the electronic paper 100. Before the writing device carries out the writing operation, the electronic paper 100 to be written needs to be reset to refresh the electronic paper 100 to be written into fully black or fully white state. Then time sequence refresh is conducted according to contents to be written into the electronic paper 100. The above-mentioned reset operation is known to those skilled in the art and will not be described any more here. In addition, "the upper surface of the array substrate 70" refers to the upper surface of the array substrate 70 illustrated in FIG. 6, namely the surface of the array substrate 70 contacting the electronic paper 100.

In embodiments of the present invention, as illustrated in FIGS. 2 and 6, the array substrate 70 may include a plurality of data lines 74 and a plurality of scanning lines 72 defining the array substrate 70 into a plurality of pixel units 71, each of the pixel units 71 is provided with a pixel electrode 73. The array substrate driving module 30 includes a gate driver 31 to which the scanning lines 72 is electrically connected and a source driver 32 to which the data lines 74 are electrically connected.

It is to be understood that each pixel unit 71 is provided with a thin film transistor 75 including a drain electrode 75a, an active layer 75b, a source electrode 75c, and a gate electrode 75d. The drain electrode 75a is electrically connected with the pixel electrode 73, the source electrode 75c is electrically connected with a data line 74, the active layer 75b of the thin film transistor 75 is located over the gate electrode 75d, and the gate electrode 75d is disposed in the same layer as the scanning lines in an embodiment of the present invention (scanning lines not illustrated in FIG. 6 of a cross-sectional view).

As illustrated in FIG. 6, the array substrate 70 may further include a gate insulating layer 77 on the gate electrode 75d. The array substrate 70 may further include a resin layer 76 under the pixel electrode 73. The resin layer 76 can improve smoothness of the upper surface of the array substrate 70, reduce parasitic capacitance between the pixel electrode 73 and other metal leads (data lines 74, scanning lines, etc.), reduce crosstalk between adjacent pixel units 71 and can improve effective duty cycle of pixels.

It is to be understood that the structure of the array substrate 70 described in the above is merely an example rather than used to limit the structure of the array substrate 70. For example, the array substrate 70 may have a top gate structure (that is, the gate electrode 75d is provided over the active layer 75b).

After the input module 20 inputs operation instructions to the master control module 10, the master control module 10 converts the operation instructions into data signals and scanning signals, transfers data signals to the source driver 32, and transfers scanning signals to the gate driver 31.

In the array substrate 70 in this implementation, the upper surface of the array substrate 70 refers to the surface on which the pixel electrodes 73 are located. Further, as illustrated in FIG. 6, in this implementation, the electronic paper 100 cooperating with the array substrate 70 includes an upper substrate 110, a common electrode 120 disposed on a bottom surface of the upper substrate 110, and an insulating lower substrate 140 disposed beneath the common electrode 120, with electronic ink 130 filled between the upper substrate 110 and the lower substrate 140.

After the input module 20 inputs operation instructions to the master control module 10, the master control module 10 converts the operation instructions into data signals and scanning signals, and transfer these signals to the source driver 32 and the gate driver 31 respectively. The scanning lines 72 turn on the thin film transistors 75 according to the scanning signals, and the data lines 74 apply voltages corresponding to the data signals to the pixel electrodes 73. The electronic ink 130 moves under the action of electric fields formed between the common electrode 120 and the pixel electrodes 73, and respective gray scale display can be obtained.

Figure 3:
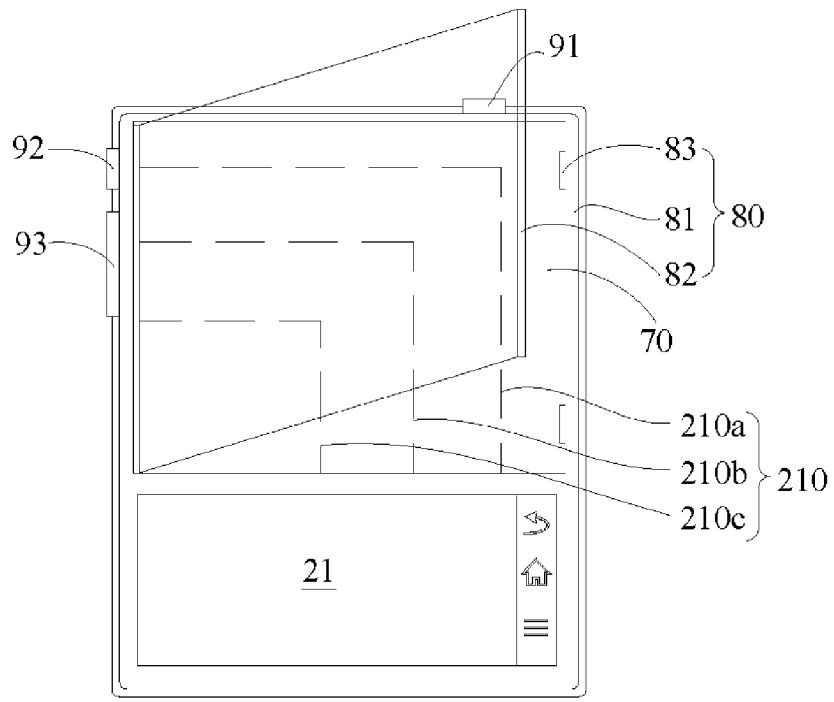
FIG. 3 is a structure schematic diagram of a writing device provided in an embodiment of the present invention.

Furthermore, as illustrated in FIGS. 3 and 4, it is possible to divide the array substrate 70 of the writing device into a plurality of regions, and each of the regions have an unique size to correspond to the electronic paper 100 matching the size. Accordingly, as illustrated in FIGS. 1 and 2, the writing device may include a position sensing module 200 disposed on the upper surface of the array substrate 70 and electrically connected with the master control module 10. The position sensing module 200 is capable of sensing the size of the electronic paper 100 disposed on the array substrate 70 and transferring the size signal of the electronic paper 100 to the master control module 10, and then the master control module 10 sends respective operation instructions to the array substrate driving module 30 to control the gate driver 31 to send scanning signals to scanning lines only in the region where the electronic paper 100 is disposed. The position sensing module 200 is set to be able to write information more precisely into the electronic paper 100.

Figure 7:
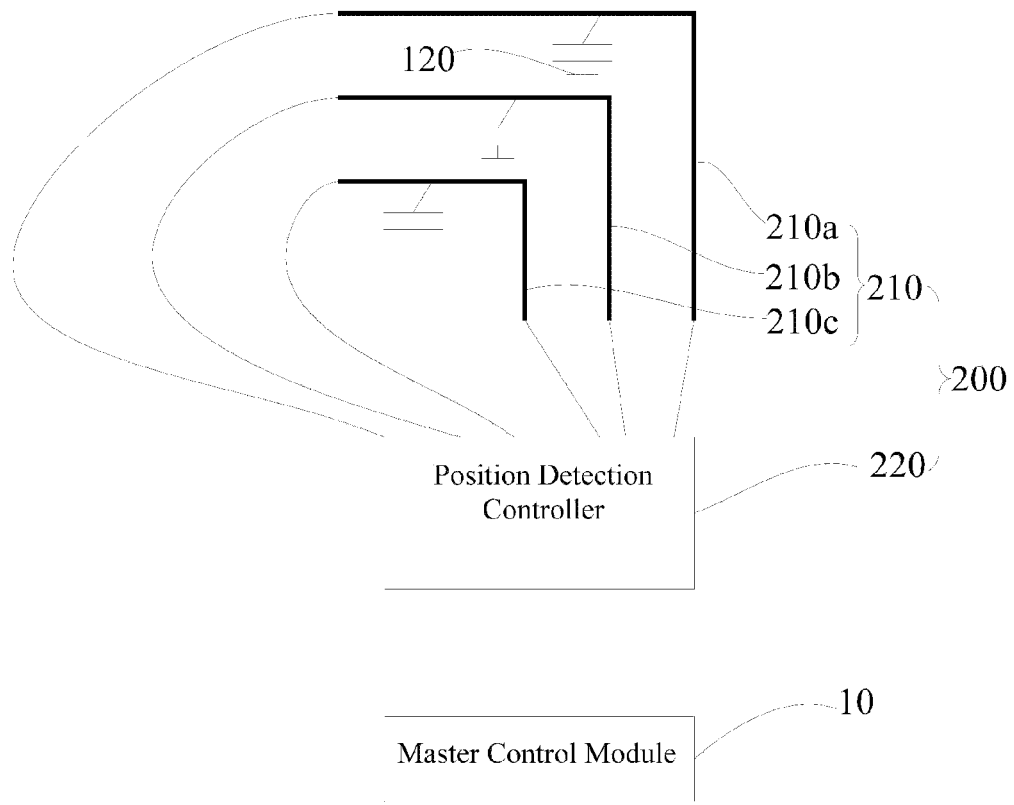
FIG. 7 is a schematic diagram of a position sensing module of the writing device provided in an embodiment of the present invention.

For example, as illustrated in FIG. 7, the position sensing module 200 may include a plurality of size lines 210 (first size line 210a, second size line 210b and third size line 210c in FIGS. 3 to 7) and a position detection controller 220 electrically connected with the plurality of size lines 210 respectively. The position detection controller 220 is further electrically connected with the master control module 10, in addition to the size lines 210. As illustrated in FIG. 7, a first end of each size line 210 is electrically connected with a first end of the position detection controller 220, and a second end of each size line 210 is electrically connected with a second end of the position detection controller 220.

In the embodiment as illustrated in FIG. 7, a first end of the first size line 210a is electrically connected with the first end of the position detection controller 220, and a second end of the first size line 210a is electrically connected with the second end of the position detection controller 220; a first end of the second size line 210b is electrically connected with the first end of the position detection controller 220, and a second end of the second size line 210b is electrically connected with the second end of the position detection controller 220; a first end of the third size line 210c is electrically connected with the first end of the position detection controller 220, and a second end of the third size line 210c is electrically connected with the second end of the position detection controller 220.

Figure 8A:
FIG. 8a is a waveform diagram of pulse signals emitted by the position detection controller of the position sensing module.
Figure 8B:
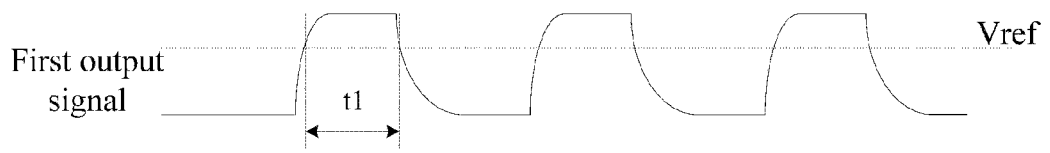
FIG. 8b is waveform diagram of a first output signal output by a size line in a region where no electronic paper is provided to a position detection controller.
Figure 8C:
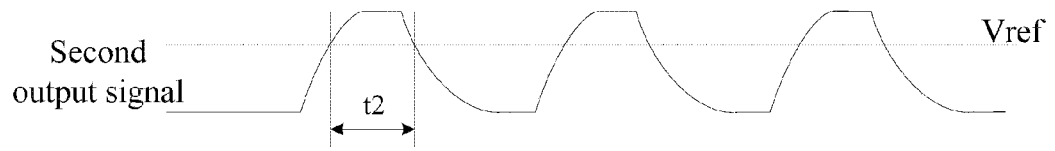
FIG. 8c is waveform diagram of a second output signal output by a size line in a region where electronic paper is provided to a position detection controller.

As illustrated in FIGS. 8a-c, the first end of the position detection controller 220 can send a pulse signal at a fixed frequency to the size lines 210 (as illustrated in FIG. 8a), and the pulse width varies after the pulse signal passes the size lines 210 (as illustrated in FIGS. 8b and 8c). The second end of the position detection controller 220 is configured to receive output signals which have varied waveforms after passing the size lines 210.

The operation principle of the position sensing module 200 will be described below with reference to FIGS. 5 and 8a-c. As illustrated in FIG. 5, the size of the electronic paper 100 to be written corresponds to the third size line 210c. After the electronic paper 100 is placed onto the array substrate 70, capacitance C1 is produced between the common electrode 120 on the electronic paper 100 and the third size line 210c, while capacitance corresponding to the first size line 210a and the second size line 210b are both C0. It is understood that capacitance C1 is greater than capacitance C0.

The first end of the position detection controller 220 sends pulse signals at a fixed frequency to the first end of the first size line 210a, the first end of the second size line 210b, and the first end of the third size line 210c respectively. The pulse signal becomes a first output signal (as illustrated in FIG. 8b) after passing the first size line 210a and the second size line 210b, and the waveform of the first output signal is not a square wave any more (namely, delay occurs). The pulse signal becomes a second output signal (as illustrated in FIG. 8c) after passing the third size line 210c, and the waveform of the second output signal is not square wave either any more (namely, delay occurs too), and because the third size line 210c and the common electrode lines 120 on the electronic paper 100 produce capacitance C1 greater than capacitance C0, the pulse width of the second output signal is smaller than that of the first output signal. This indicates that delay effects produced for presence and absence of electronic paper 100 are not the same.

The pulse widths of the first output signal and the second output signal can be determined in the following way. As illustrated in FIGS. 8b and 8c, a reference voltage Vref is set in the position detection controller 220, and the pulse width of the first output signal and the pulse width of the second output signal are compared to the reference voltage Vref respectively. After comparison, the respective pulse widths of the first output signal and the second output signal can be obtained. In the embodiment provided in the present invention, the pulse width of the first output signal is t1, and the pulse width of the second output signal is t2. As can be seen from FIGS. 8a-c, compared with the pulse signal, in addition to variation of the pulse widths of the first output signal and the second output signal, the waveforms of the first output signal and the second output signal are not same as the pulse signal any longer. That is, the waveform of the pulse signal is square wave, while waveforms of the first output signal and the second output signal are not square wave any more. It is possible to set an oscilloscope connected with the writing device for displaying waveforms of the first output signal and the second output signal.

The position detection controller 220 transfers the first output signal and the second output signal to the master control module 10 respectively, and the master control module 10 can determine the size line with which the common electrode 120 on the electronic paper 100 produces the capacitance C1, depending on the pulse widths and waveforms of the first output signal and the second output signal, and send out a signal to the array substrate driving module 30 according to the determination, making the gate driver 31 of the array substrate driving module 30 to send scanning signals to scanning lines 72 only in regions corresponding to the third size line 210c.

When the size of electronic paper 100 matches the maximum size indicated by the size line on the array substrate 70, the electronic paper tag system including the electronic paper 100 and the writing device may be used as an e-book.

In the embodiments of the present invention, the form of the input module 20 is not limited. The input module 20 may be a keyboard etc. In order to facilitate inputting, and endow the writing device with a smaller volume. For example, as illustrated in FIG. 2, the input module 20 may include a touch screen 21 and a touch screen control module 22 electrically connected with the touch screen 21, which is electrically connected with the master control module 10, and the touch screen 21 is configured to transfer information to be written into the electronic paper (such as merchandise information, house number etc.) to the touch screen control module 22 that can convert the information input by the touch screen 21 into operation instructions and transfer the operation instructions to the master control module 10.

It is understood that as illustrated in FIGS. 4 and 5, what is input directly through the touch screen 21 is the information to be displayed on the electronic paper 100, which can only be converted into operation instructions that can be identified by the master control module 10 by processing the above-mentioned information with the touch screen control module 22.

The touch screen 21 may include a virtual keyboard with which information to be displayed on the electronic paper is input. Alternatively, for example, as illustrated in FIGS. 4 and 5, the touch screen 21 may include a preview interface 21a and an input interface 21b. Various kinds of information can be input through the input interface 21b, and the information is converted by the touch screen control module 22 into operation instructions, and images to be displayed on the electronic paper 100 are viewed through the preview interface 21a. As illustrated in FIGS. 4 and 5, it is also possible to set various function keys on the input interface 21b. In such a case, a virtual keyboard may be set on the input interface 21b of the touch screen 21 through which various kinds of information is input.

For example, as illustrated in FIG. 1, the writing device may further include an audio output module 50 electrically connected with the master control module 10 to output cue tones after completing the writing operation.

For example, the writing device may further include a wireless communication module 40 capable of receiving and transmitting wireless signals. The wireless communication module 40 can perform communication and data transmission with other devices (such as a cellphone, another writing device, or a computer). The electronic paper tag system including the writing device provided in an embodiment of the present invention can function as a flat display. After the electronic paper 100 is placed on the array substrate 70, communication with communication base stations is implemented with a wireless communication module 40 over a wireless network. The wireless network may be any one of a GPS network, a GPRS network or a 3G network.

Of course, the wireless signal may further include one or more of WIFI, wireless local area network, infrared signal, Bluetooth signal and Zigbee signal.

The writing device may further include a storage module 60 electrically connected with the master control module 10 to store operation instructions and provide storage space for the master control module 10 to control writing operation. In an embodiment of the present invention, the storage module 60 may include one or more of a dynamic memory, a flash disk, a SD card (Secure Digital Memory Card), and a hard disk. The storage module 60 may be further configured to store files and programs.

To be portable, for example, as illustrated in FIGS. 3 to 5, the writing device may further include an enclosure 80, and within the enclosure 80 the master control module 10 and the input module 20 are accommodated. The upper surface of the array substrate 70 is exposed outside of the enclosure 80. The upper surface of the array substrate 70 is exposed outside of the enclosure 80 to facilitate placement of the electronic paper 100 to be written on the upper surface of the array substrate 70. The enclosure 80 integrates the master control module 10 and the input module 20 together to endow the writing device with a smaller volume. The audio output module 50, the wireless communication module 40 and the array substrate driving module 30 described in the above may be provided in the enclosure 80 at the same time.

To facilitate to better fix the electronic paper 100 in writing the electronic paper 100, for example, the enclosure 80 may include a body 81, in which the master control module 10, the input module 20, the array substrate 70 and the array substrate driving module 30 are embedded, and a cover 82 pivotably mounted on the body 81, and the cover 82 can cover at least a part of the upper surface of the array substrate 70. In writing into the electronic paper 100, the electronic paper 100 is placed on the upper surface of the array substrate 70, and then the cover 82 is used to cover the electronic paper 100 to fix the electronic paper 100 such that the electronic paper 100 does not move when performing writing operation.

In the embodiment of the present invention, there is no special limitation on the size of the cover 82 as long as it can fix the electronic paper 100 on the upper surface of the array substrate 70 when writing into the electronic paper 100. For example, the cover 82 is configured to be able to cover the entire upper surface of the array substrate 70 so as to well fix electronic paper 100 of any size.

In the example in which the storage module 60, the audio output module 50 and the wireless communication module 40 are provided, the storage module 60, the audio output module 50 and the wireless communication module 40 are also embedded in the body 81. The cover 82 may be mounted on the body 81 with a pivot. For example, the cover 82 may be made of a transparent glass plate or a plastic plate to facilitate viewing of writing of the electronic paper 100.

In order to further fix the electronic paper 100 while writing, furthermore, for example, the enclosure 80 further includes a fastener 83 mounted on the body 81 which can fasten the cover 82. For example, the fastener may be mounted on the opposite side of the pivot.

To facilitate operation, for example, as illustrated in FIGS. 3 to 5, the writing device may further include a first switch key 91 electrically connected with the master control module 10 to control turning-on or turning-off of the master control module 10. The first switch key 91 extends through the enclosure 80 and protrudes from the enclosure 80. The master control module 10 may be turned on or off by the operation of the first switch key 91.

In addition to obtaining electronic tags with desired information by writing the electronic paper 100 with the writing device, the electronic paper tag system including the writing device and the electronic paper 100 can also be used as a flat display. In such a case, the writing device may further include a second switch key 92 electrically connected with the touch screen control module 22 to control turning-on or turning-off of the touch screen control module 22. The second switch key 92 extends through the enclosure 80 and protrudes from the enclosure 80. When the electronic paper tag system including the writing device and the electronic paper 100 is used as a flat display, the touch screen 21 may be shut down.

Furthermore, the writing device may further include a sound volume adjusting key 93 electrically connected with the audio output module 50, with which the sound volume output by the audio output module 50 can be controlled.

As another aspect of the present invention, as illustrated in FIGS. 4 to 6, an electronic paper tag system is further provided including a writing device and a piece of electronic paper 100; the writing device is any one of the above-mentioned writing devices provided in the embodiments of the present invention, and the electronic paper 100 is provided independent of the writing device, and the bottom surface of the electronic paper 100 contacts the upper surface of the array substrate 70.

As described above, in the embodiments of the present invention, the electronic paper 100 and the writing device are independent to each other. After the electronic paper 100 has been written, the electronic paper 100 that has been written information is separated from the writing device, that is, the electronic paper 100 that has been written information can be used in situations in which tag information is not required to be updated frequently. If the information on the electronic paper 100 is to be replaced, it is only required to remove the electronic paper 100 and put it into the writing device for re-writing.

As the electronic paper 100 and the writing device are made independent to each other, one writing device may be used to write a plurality of pieces of electronic paper 100, hence the overall costs of the electronic paper tag system can be reduced.

As illustrated in FIG. 6, the electronic paper 100 may include an upper substrate 110, a common electrode 120 disposed on a bottom surface of the upper substrate 110, and an insulating lower substrate 140 disposed under the common electrode 120, with electronic ink 130 filled between the upper substrate 110 and the lower substrate 140.

In the embodiments of the present invention, the electronic ink 130 may be prepared by a micro-capsule technology or a micro-cup technology. The lower substrate 140 may be made of a transparent material. The lower substrate 140 together with the upper substrate 110 mainly functions to protect the electronic ink 130. In order to reduce the voltage required for driving the electronic ink 130, the lower substrate 140 may have a small thickness (for example, from 1 mm to 2 mm). Generally, both the upper substrate 110 and the lower substrate 140 may be made of a polymer.

Of course, in the embodiments of the present invention, the electronic paper 100 is not limited to the above-mentioned structure. For example, it is possible to not provide a common electrode 120 on the upper substrate 110 of the electronic paper 100 but provide the common electrode 120 on the array substrate in the same layer as the scanning lines 72.

What have been described are only exemplary implementations of the present invention, the protection scope of the present invention is not limited thereto. Variations and modifications of embodiments of the present invention that easily occur to those skilled in the art should be encompassed in the protection scope of the present invention. The protection scope of the present invention is defined by the appending claims.

The invention claimed is:

1. A writing device for electronic paper comprising:
an array substrate, a master control module, an input module electrically connected with the master control module, an array substrate driving module electrically connected with the master control module, and a position sensing module electrically connected with the master control module for sensing the electronic paper disposed on the array substrate,
the array substrate being electrically connected with the array substrate driving module, an upper surface of the array substrate being configured to be electrically connected with electronic paper to be written, the input module being configured to input operation instructions to the master control module, and the master control module being configured for driving the array substrate driving module to drive the array substrate for performing writing operation according to the operation instructions;
wherein the position sensing module comprises at least one size line made of a conductive material and a position detection controller electrically connected with the master control module, the at least one size line is disposed on an upper surface of the array substrate and divides the upper surface of the array substrate into regions of respective sizes, a first end of each size line is electrically connected with a first end of the position detection controller, and a second end of each size line is electrically connected with a second end of the position detection controller; and
wherein the position detection controller is configured to transmit a pulse signal from the first end of the position detection controller to the first end of each size line and to receive, at the second end of the position detection controller, a respective output signal corresponding to the pulse signal from the second end of each size line.

2. The writing device according to claim 1, wherein the input module comprises a touch screen and a touch screen control module electrically connected with the touch screen, the touch screen control module is electrically connected with the master control module, and the touch screen is configured to transfer information to be written into the electronic paper to the touch screen control module, the touch screen control module is capable of converting the information input through the touch screen into the operation instructions, and the touch screen control module is capable of transferring the operation instructions to the master control module.

3. The writing device according to claim 1, further comprising an audio output module electrically connected with the master control module and configured to output cue tone after completing the writing operation.

4. The writing device according to claim 1, further comprising a wireless communication module capable of receiving and transmitting wireless signals.

5. The writing device according to claim 1, further comprising a storage module electrically connected with the master control module for storing the operation instructions and providing storage space for the master control module to control the writing operation.

6. The writing device according to claim 1, wherein the array substrate comprises a plurality of data lines and a plurality of scanning lines, the data lines and the scanning lines dividing the array substrate into a plurality of pixel units, each of the pixel units is provided with a pixel electrode, and the array substrate driving module comprises a gate driver to which the scanning lines are electrically connected and a source driver to which the data lines are electrically connected.

7. The writing device according to claim 1, further comprising an enclosure, wherein the master control module, the input module, the array substrate and the array substrate driving module are provided in the enclosure, and the upper surface of the array substrate is exposed outside of the enclosure.

8. The writing device according to claim 7, wherein the enclosure comprises a body in which the master control module, the input module, the array substrate and the array substrate driving module are embedded and a cover pivotably mounted on the body and capable of covering at least a part of the upper surface of the array substrate.

9. The writing device according to claim 8, wherein the enclosure further comprises a fastener which is mounted on the body and capable of fastening the cover.

10. The writing device according to claim 7, further comprising a first switch key, which is electrically connected with the master control module and configured to control turning-on or turning-off of the master control module, the first switch key extending through the enclosure and protruding from the enclosure.

11. The writing device according to claim 7, further comprising a second switch key which is electrically connected with the touch screen control module and configured to control turning-on or turning-off of the touch screen control module, the second switch key extending through the enclosure and protruding from the enclosure.

12. An electronic paper tag system comprising a writing device and a piece of electronic paper, wherein the writing device is the writing device according to claim 1, and the electronic paper is provided independent of the writing device, and a bottom surface of the electronic paper contacts the upper surface of the array substrate.

13. The electronic paper tag system according to claim 12, wherein the electronic paper comprises an upper substrate, a common electrode disposed on a bottom surface of the upper substrate, and an insulating lower substrate disposed under the common electrode, with electronic ink filled between the upper substrate and the lower substrate.

14. The writing device according to claim 2, further comprising an enclosure, wherein the master control module, the input module, the array substrate and the array substrate driving module are provided in the enclosure, and the upper surface of the array substrate is exposed outside of the enclosure.

15. The writing device according to claim 2, further comprising a position sensing module electrically connected with the master control module for sensing the electronic paper disposed on the array substrate.

16. The writing device according to claim 3, further comprising a position sensing module electrically connected with the master control module for sensing the electronic paper disposed on the array substrate.

17. A writing device for electronic paper comprising:
an array substrate, a master control module, an input module electrically connected with the master control module, an array substrate driving module electrically connected with the master control module, and a position sensing module electrically connected with the master control module for sensing the electronic paper disposed on the array substrate,
the array substrate being electrically connected with the array substrate driving module, an upper surface of the array substrate being configured to be electrically connected with electronic paper to be written, the input module being configured to input operation instructions to the master control module, and the master control module being configured for driving the array substrate driving module to drive the array substrate for performing writing operation according to the operation instructions,
wherein the array substrate comprises a plurality of data lines and a plurality of scanning lines, the data lines and the scanning lines dividing the array substrate into a plurality of pixel units, each of the pixel units is provided with a pixel electrode,
wherein the each pixel unit is provided with a thin film transistor including a drain electrode, an active layer, a source electrode, and a gate electrode,
wherein the position sensing module comprises at least one size line made of a conductive material and a position detection controller electrically connected with the master control module, the at least one size line is disposed on an upper surface of the array substrate and divides the upper surface of the array substrate into regions of respective sizes, a first end of each size line is electrically connected with a first end of the position detection controller, and a second end of each size line is electrically connected with a second end of the position detection controller, and
wherein the position detection controller is configured to transmit a pulse signal from the first end of the position detection controller to the first end of each size line and to receive, at the second end of the position detection controller, a respective output signal corresponding to the pulse signal from the second end of each size line.

18. The writing device according to claim 17, wherein the drain electrode is electrically connected with the pixel electrode, the source electrode is electrically connected with a data line, and the active layer is located over the gate electrode.

* * * * *